US010660298B2

United States Patent
Cantwell et al.

(10) Patent No.: US 10,660,298 B2
(45) Date of Patent: May 26, 2020

(54) ANIMAL CRATE ASSEMBLY

(71) Applicant: MID-WEST METAL PRODUCTS COMPANY, INC., Muncie, IN (US)

(72) Inventors: Brad Cantwell, Muncie, IN (US); Michael E. Greene, Muncie, IN (US); Stew Kerr, Muncie, IN (US); David J. Nolley, Muncie, IN (US)

(73) Assignee: MID-WEST METAL PRODUCTS COMPANY, INC., Muncie, IN (US)

( * ) Notice: Subject to any disclaimer, the term of this patent is extended or adjusted under 35 U.S.C. 154(b) by 350 days.

(21) Appl. No.: 15/480,732

(22) Filed: Apr. 6, 2017

(65) Prior Publication Data

US 2018/0288962 A1     Oct. 11, 2018

(51) Int. Cl.
*A01K 1/03*     (2006.01)
*A01K 1/00*     (2006.01)

(52) U.S. Cl.
CPC .......... *A01K 1/0064* (2013.01); *A01K 1/0058* (2013.01); *A01K 1/03* (2013.01); *A01K 1/033* (2013.01)

(58) Field of Classification Search
CPC .......... A01K 1/03; A01K 1/031; A01K 1/033; A01K 1/0236; A01K 1/0245
See application file for complete search history.

(56) References Cited

U.S. PATENT DOCUMENTS

| | | |
|---|---|---|
| 2,222,008 A | 11/1940 | White |
| 3,791,347 A | 2/1974 | Lovell |
| 3,812,999 A | 5/1974 | Joseph |
| 3,896,766 A | 7/1975 | Martin |
| 4,023,698 A | 5/1977 | Joseph |
| 4,763,606 A | 8/1988 | Ondrasik |
| 4,770,127 A | 9/1988 | Volk |
| 5,233,939 A | 8/1993 | Randolph |
| 5,373,810 A | 12/1994 | Martin |

(Continued)

FOREIGN PATENT DOCUMENTS

FR     2876060 A1     4/2006

OTHER PUBLICATIONS

Pet Gear Inc.; "Travel Lite Steel Crates"; www.petgearinc.com/product_info.asp?id=189; Pub. 2011("Pet Gear Inc.") pp. 1-2, USA.

(Continued)

*Primary Examiner* — Kristen C Hayes
(74) *Attorney, Agent, or Firm* — Taft Stettinius & Hollister LLP; Stephen F. Rost (57) ABSTRACT

A side of an animal enclosure including a plurality of interconnected horizontal and vertical wires, where the plurality of horizontal wires includes a top wire and a bottom wire, and the plurality of vertical wires includes a first end wire and a second end wire. A plurality of hooked ends are formed at the ends of either the plurality of horizontal wires or the plurality of vertical wires. The top wire, the bottom wire, the first end wire, and the second end wire define an outer periphery of the first member, and the plurality of hooked ends extend beyond the outer periphery defined by the top wire, the bottom wire, the first end wire, and the second end wire. The top wire, bottom wire, first end wire and second end wire do not form a hooked end at any of their respective ends.

17 Claims, 5 Drawing Sheets

(56) References Cited

U.S. PATENT DOCUMENTS

| | | | |
|---|---|---|---|
| 5,549,073 A * | 8/1996 | Askins | A01K 1/032 |
| | | | 119/461 |
| 5,615,514 A | 4/1997 | Meade | |
| 5,626,098 A | 5/1997 | Askins et al. | |
| 5,649,500 A | 7/1997 | Klavemann et al. | |
| 5,653,194 A * | 8/1997 | Guy | A01K 31/08 |
| | | | 119/453 |
| 5,845,432 A | 12/1998 | Tully et al. | |
| 6,092,488 A | 7/2000 | Allawas | |
| 6,192,834 B1 | 2/2001 | Kotozsvari | |
| 6,513,456 B2 | 2/2003 | Sherman et al. | |
| 6,681,720 B1 * | 1/2004 | Skurdalsvold | A01K 1/03 |
| | | | 119/461 |
| 7,918,188 B1 * | 4/2011 | Harper | A01K 1/0245 |
| | | | 119/481 |
| 8,408,416 B2 | 4/2013 | Cheng-Lung et al. | |
| 9,399,889 B2 * | 7/2016 | Cantwell | A01K 1/032 |
| 10,085,416 B2 * | 10/2018 | Link | A01K 1/034 |
| 2004/0134444 A1 | 7/2004 | Shiever et al. | |
| 2005/0034679 A1 * | 2/2005 | Link | A01K 1/0245 |
| | | | 119/474 |
| 2007/0000447 A1 | 1/2007 | Jakubowski et al. | |
| 2008/0245313 A1 | 10/2008 | Jakubowski et al. | |
| 2010/0282179 A1 | 11/2010 | Ho | |
| 2015/0305297 A1 * | 10/2015 | Link | A01K 1/0245 |
| | | | 119/474 |

OTHER PUBLICATIONS

European Search Report for European Patent Application No. 12250009.3 dated Aug. 1, 2013: 9 Pages.

\* cited by examiner

Fig. 5

ANIMAL CRATE ASSEMBLY

FIELD OF THE DISCLOSURE

The present disclosure relates to a crate, and, in particular, to an animal crate assembly for housing an animal.

BACKGROUND

The use of animal cages or crates is well known. Many conventional cages have been developed over the years for housing animals of different shapes and sizes. For instance, animal cages typically house dogs and cats. Rabbits, rodents and other small animals have also been known to be housed by such cages and are quite common. In fact, such cages are also used for farm animals when needed, including ducks and chickens. As cages have been further developed, the portability and ease of use have become points of emphasis. Some conventional cages, for example, have been designed to collapse to a compact structure for portability. Others have been designed to be of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. The animal enters or exits the cage through an opening when the door is opened, and the animal can be safely contained in the cage when the door is closed. Many conventional cages include a door that is attached to the cage with a hinge. In some conventional cages, the doors swing from a side of the cage and in others the door swings from the bottom or top of the cage. This allows the door to be swung from a closed position to an open and vice versa. In cages with side or top swinging doors, the animal can walk into the cage. In cages with bottom swinging doors, the animal is typically placed into and removed from the cage by the owner. A variety of latches have been incorporated into the design of the door to allow a user to open, close, and or securely latch the door.

Many of these conventional designs have limitations, however. With regards to an exercise pen, for example, the door is generally formed by an entire height and width of a panel or side member of the pen. Many of these doors are not able to be securely latched or may not prevent an animal from escaping the enclosure. In addition, due to the size of the door, it can be difficult for an owner to reach into the interior of the exercise pen and retrieve a desired animal when two or more animals are enclosed therein.

Therefore, a need exists for an improved animal enclosure that provides better means for accessing the interior of the enclosure which overcomes some of the above-mentioned limitations in the prior art.

SUMMARY

In one embodiment of the present disclosure, an animal enclosure includes a plurality of members defining an interior of the enclosure, where the plurality of members includes at least a first member; a frame of the first member having a plurality of interconnected wires that define an opening for an animal to pass therethrough and to enter or exit the interior of the enclosure; a door of the first member having a plurality of interconnected wires and being coupled to the frame, the door being pivotable about a pivot wire of the frame to move between an open position and a closed position; a latch assembly for releasably coupling the door and the frame to one another; and the plurality of wires interconnected with one another of the first member comprising a plurality of horizontal wires and a plurality of vertical wires, where the plurality of horizontal wires includes a top wire and a bottom wire, and the plurality of vertical wires includes a first end wire and a second end wire; wherein, the top wire, the bottom wire, the first end wire, and the second end wire define an outer periphery of the first member; wherein, the top wire is coupled at one end to the first end wire to form a first corner and at an opposite end to the second end wire to form a second corner, and the bottom wire is coupled at one end to the first end wire to form a third corner and at an opposite end to the second end wire to form a fourth corner; wherein, at least one of the plurality of horizontal or vertical wires forms a hooked end, and the top wire, bottom wire, first end wire and second end wire do not form a hooked end.

In a first example of this embodiment, the top wire defines an axis; and the hooked end of the at least one of the plurality of vertical wires extends beyond the axis and outer periphery defined by the top wire. In a second example, the bottom wire defines an axis; and the hooked end of the at least one of the plurality of vertical wires extends beyond the axis and outer periphery defined by the bottom wire. In a third example, the first end wire defines an axis; and the hooked end of the at least one of the plurality of horizontal wires extends beyond the axis and outer periphery defined by the first end wire. In a fourth example, the second end wire defines an axis; and the hooked end of the at least one of the plurality of horizontal wires extends beyond the axis and outer periphery defined by the second end wire.

In another embodiment, an animal enclosure includes a plurality of members defining an interior of the enclosure, where the plurality of members includes a top member, a bottom member, a first side member, a second side member, a third side member, and a fourth side member; a door having a plurality of interconnected wires and being coupled to the first member, the door being pivotable or slideable about a pivot wire of the first member so that the door is movable between an open position and a closed position; a latch assembly for releasably coupling the door and the first side member to one another; a bent wire formed by an elongated body have a first bent end and a second bent end, the first bent end and second bent end being bent in a same direction relative to the elongated body; wherein, the bent wire is coupled to the top member, and is disposed between the first side member and the second side member.

In one example of this embodiment, the first side member includes a first top wire and the second side member includes a second top wire; and the first bent end is disposed between the top member and the first top wire, and the second bent end is disposed between the top member and the second top wire. In a second example, the top member includes a plurality of horizontal wires and a plurality of vertical wires interconnected with one another; further wherein, the bent wire is coupled to the top member and oriented in the same direction as either the plurality of horizontal wires or the plurality of vertical wires. In a third example, the plurality of horizontal wires comprises a first horizontal end wire and a second horizontal end wire, the first and second horizontal end wires defining outer peripheries of the top panel at each respective end thereof; the plurality of vertical wires comprises a first vertical end wire and a second vertical end wire, the first and second vertical end wires defining outer peripheries of the top panel at each respective end thereof; and the first bent end is coupled to the first vertical end wire and the second bent end is coupled to the second vertical end wire, or the first bent end is coupled to the first horizontal end wire and the second bent end is coupled to the second horizontal end wire.

In a fourth example, the first bent end is disposed between the first vertical end wire and the first top wire and the second bent end is disposed between the second vertical end wire and the second top wire, or the first bent end is disposed between the first horizontal end wire and the first top wire and the second bent end is disposed between the second horizontal end wire and the second top wire. In a fifth example, a second bent wire is formed by an elongated body having a first bent end and a second bent end, the first bent end and second bent end being bent in a same direction relative to the elongated body; wherein, the second bent wire is coupled to the bottom member, and the first bent end of the second bent wire is disposed between the bottom member and the first side member, and the second bent end of the second bent wire is disposed between the bottom member and the second side member.

In a sixth example, a second bent wire is formed by an elongated body have a first bent end and a second bent end, the first bent end and second bent end being bent in a same direction relative to the elongated body; wherein, the second bent wire is coupled to the bottom member, the first side member, the second side member, the third side member or the fourth side member, and the first bent end of the second bent wire is disposed between whichever member it is coupled to and another of the bottom member, the first side member, the second side member, the third side member or the fourth side member, and the second bent end of the second bent wire is disposed between whichever member it is coupled to and another of the bottom member, the first side member, the second side member, the third side member or the fourth side member.

In a seventh example, each of the top member, bottom member, first side member, second side member, third side member, and fourth side member comprises a plurality of horizontal wires and a plurality of vertical wires, where the plurality of horizontal wires includes a top wire and a bottom wire, and the plurality of vertical wires includes a first end wire and a second end wire; and the top wire, the bottom wire, the first end wire, and the second end wire define an outer periphery of the each member. In an eighth example, the top wire of at least one member is coupled at one end to the first end wire of the same member to form a first corner and at an opposite end to the second end wire of the same member to form a second corner, and the bottom wire of the at least one member is coupled at one end to the first end wire of the same member to form a third corner and at an opposite end to the second end wire of the same member to form a fourth corner, at least one of the plurality of horizontal or vertical wires of the at least one member forms a hooked end; and the top wire, bottom wire, first end wire and second end wire do not form a hooked end.

In a ninth example, the top wire of the at least one member defines an axis; and the hooked end of the at least one of the plurality of vertical wires extends beyond the axis and outer periphery defined by the top wire. In a tenth example, the bottom wire of the at least one member defines an axis; and the hooked end of the at least one of the plurality of vertical wires extends beyond the axis and outer periphery defined by the bottom wire. In an eleventh example, the first end wire of the at least one member defines an axis; and the hooked end of the at least one of the plurality of horizontal wires extends beyond the axis and outer periphery defined by the first end wire.

In another example, the second end wire of the at least one member defines an axis; and the hooked end of the at least one of the plurality of horizontal wires extends beyond the axis and outer periphery defined by the second end wire. In yet another example, the top wire of another of the top, bottom, first, second, third or fourth member is coupled at one end to the first end wire of the same member to form a first corner and at an opposite end to the second end wire of the same member to form a second corner, and the bottom wire of the another member is coupled at one end to the first end wire of the same member to form a third corner and at an opposite end to the second end wire of the same member to form a fourth corner; at least one of the plurality of horizontal or vertical wires of the another member forms a hooked end; and the top wire, bottom wire, first end wire and second end wire do not form a hooked end.

In a further example, a side of an animal enclosure includes a plurality of interconnected horizontal and vertical wires, where the plurality of horizontal wires includes a top wire and a bottom wire, and the plurality of vertical wires includes a first end wire and a second end wire; and a plurality of hooked ends formed at the ends of either the plurality of horizontal wires or the plurality of vertical wires; wherein, the top wire, the bottom wire, the first end wire, and the second end wire define an outer periphery of the first member, the plurality of hooked ends extending beyond the outer periphery defined by the top wire, the bottom wire, the first end wire, and the second end wire; wherein, the top wire is coupled at one end to the first end wire to form a first corner and at an opposite end to the second end wire to form a second corner, and the bottom wire is coupled at one end to the first end wire to form a third corner and at an opposite end to the second end wire to form a fourth corner; further wherein, the top wire, bottom wire, first end wire and second end wire do not form a hooked end at any of their respective ends.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

The present disclosure relates to an animal enclosure. The animal enclosure can be used for multiple purposes, such as to contain one or more animals or objects. The enclosure can be made of any size for accommodating an animal or object of any size. In addition, the enclosure can be made of different materials including aluminum, plastic, and steel. The enclosure can be designed as an animal cage to define an interior that is surrounded at all sides, or it can be designed as an exercise pen in which at least one side is not present, for instance a top side.

Figure 1:
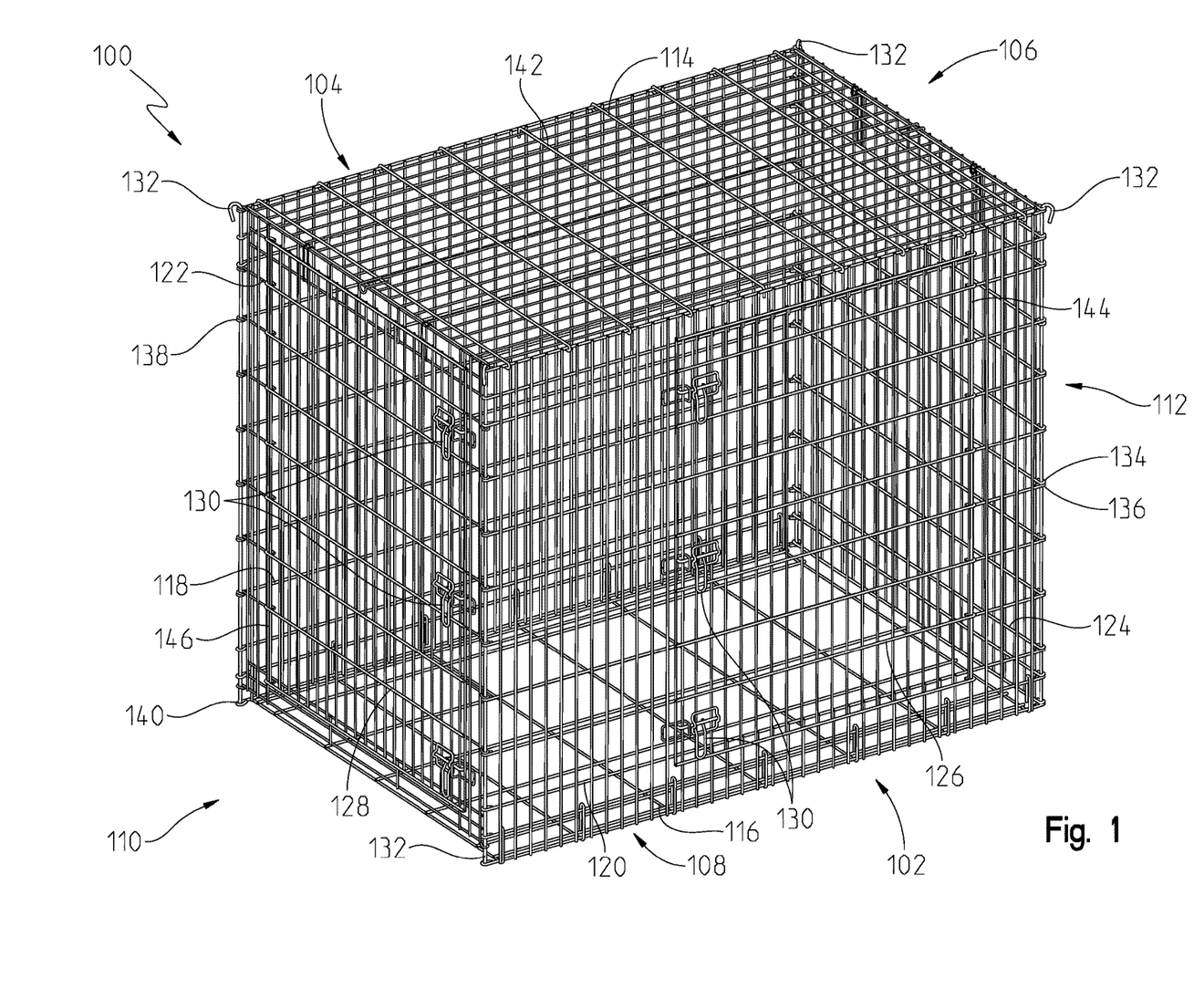
FIG. 1 is a perspective view of an animal enclosure.

Referring to FIG. 1, an exemplary embodiment of an animal enclosure 100 is shown. The enclosure 100 is in the form of an animal crate, but this is only intended to be exemplary. The enclosure 100 can be formed of substantially horizontal and vertical wires that overlap one another to define an interior portion for housing an animal. One or more of the horizontal wires can be coupled to one or more of the vertical wires, and vice versa, to add structural integrity to the enclosure 100. In other embodiments, wires are oriented in other directions than horizontal and vertical. The wires may be welded, adhered, fastened, or coupled to one another through a variety of means. The enclosure 100 can include a plurality of sides or members that form the enclosure 100.

In FIG. 1, for example, the enclosure 100 includes a front 102, a rear 104, a top 106, a bottom 108, a first side 110 and a second side 112. On the top 104, a top panel 114 is provided and on the bottom 108 is a bottom panel 116. The top and bottom panels are disposed opposite one another. A rear panel 118 is provided on the rear 104 of the enclosure 100, a front frame 120 is on the front 102, a side frame 122 is on the first side 110, and a side panel 124 is disposed on the second side 112. The top panel 114 and bottom panel 116 may be coupled to the front frame 120, side frame 122, rear panel 118 and the side panel 124 to define the interior therebetween.

A first door 126 may be pivotably coupled to the front frame 120 via a first pivot wire 144 according to any known means. The first door 126 may be hingedly coupled to the front frame 120, for example. One or more latches 130 may be used to removably couple the first door 126 to the front frame 120 in a closed position. The first door 126 may move between an open position and the closed position to allow ingress or egress from the interior of the enclosure 100.

In FIG. 1, the one or more latches 130 may include a slidebolt latch. The slide bolt latch 130 may include a frame portion affixed to the first door 126, a pin that is pivotably and slideable coupled to the frame portion, and a lever coupled to the pin. The pin may have a bent end that engages a catch portion of the front frame 120 to hold the first door 126 in its closed position.

A second door 128 may be pivotally coupled to the side frame 122 via a second pivot wire 146 according to any known means. The second door 128 may be hingedly coupled to the side frame 122, for example. One or more latches 130 may be used to removably couple the second door 128 to the side frame 122 in a closed position. The second door 128 may move between an open position and the closed position to allow ingress or egress from the interior of the enclosure 100.

In some embodiments, the animal enclosure 100 may only include a single door, i.e., the first door 126 or the second door 128. In other embodiments, there may be more than two doors. While the latches 130 are shown primarily as slidebolt latches, any type of latch may be used including upright or downturned hooks for engaging horizontal wires on the frame or door in a closed position.

The animal enclosure 100 may be designed such that it is collapsible. This may achieved in any known manner. In FIG. 1, however, the animal enclosure 100 is shown as a non-collapsible crate. The front frame 120 and the side frame 122 are coupled to one another via an elongated hook 132. A similar elongated hook 132 may connect the front frame 120 to the side panel 124, the rear panel 118 to the side frame 122, and the rear panel 118 to the side panel 124. Each elongated hook 132 passes through one or more eyelets formed by horizontal wires on the front frame 120, side frame 122, rear panel 118, and side panel 124. For example, in FIG. 1, a first eyelet 134, a second eyelet 136, a third eyelet 138, and a fourth eyelet 140 are specifically called out in the illustrated embodiment.

The first eyelet 134 is formed at one end of a horizontal wire on the side panel 124. The second eyelet 136 is formed at one end of a horizontal wire on the front frame 120. The third eyelet 138 is formed at one end of a horizontal wire on the side frame 122. Lastly, The fourth eyelet 140 is formed at one end of a horizontal wire on the rear panel 118. As shown, however, the first eyelet 134 is formed at one end of the one horizontal wire on the side panel 124, and at the opposite end of the same horizontal wire is another eyelet. Each eyelet defines an opening therein for the elongated hook 132 to pass through. When each elongated hook 132 is removed from the eyelets, it may be possible to remove one of the panels or frames from the animal enclosure 100.

Figure 2:
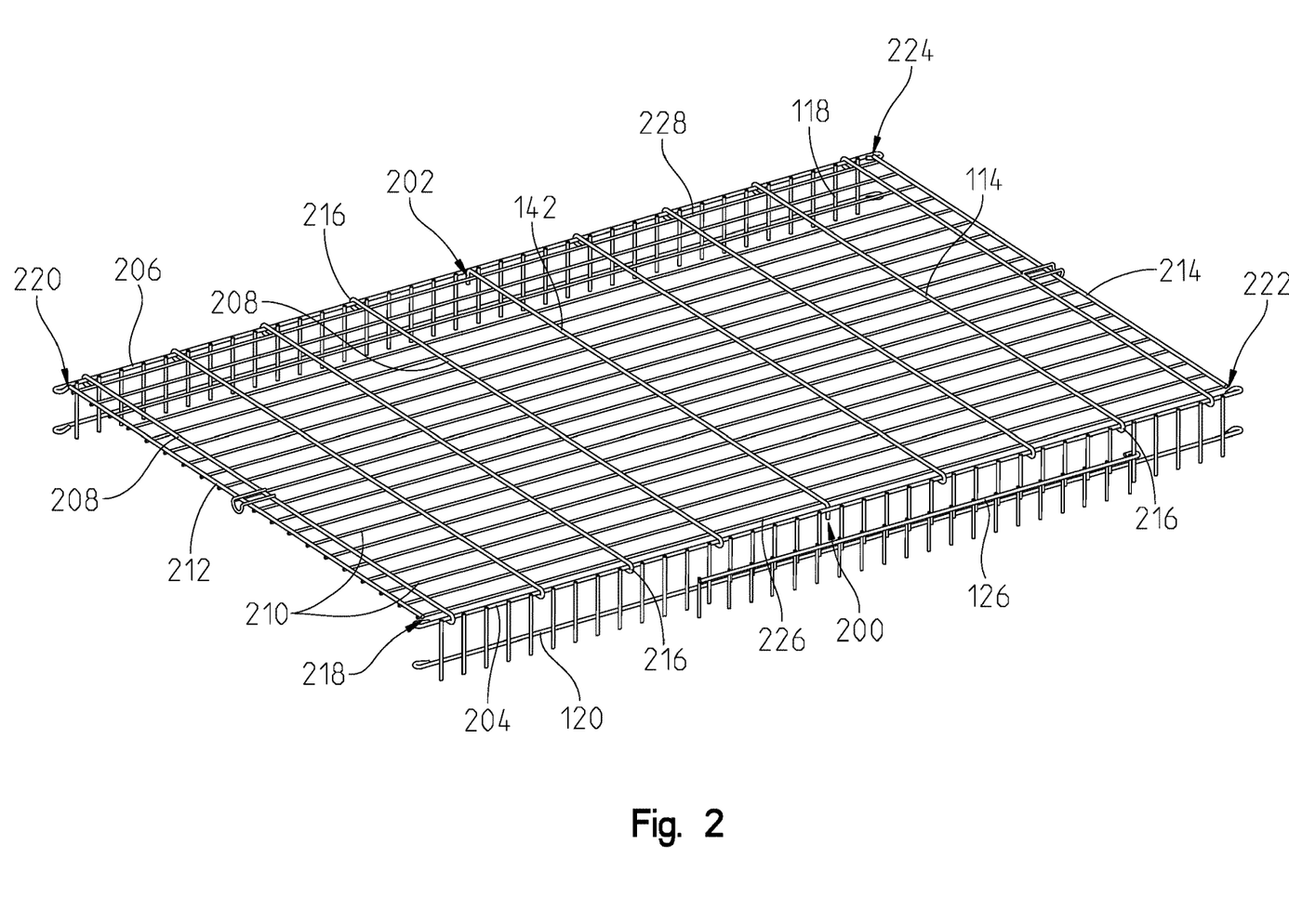
FIG. 2 is a partial perspective view of a top panel, front frame and rear panel of the animal enclosure of FIG. 1.
Figure 3:
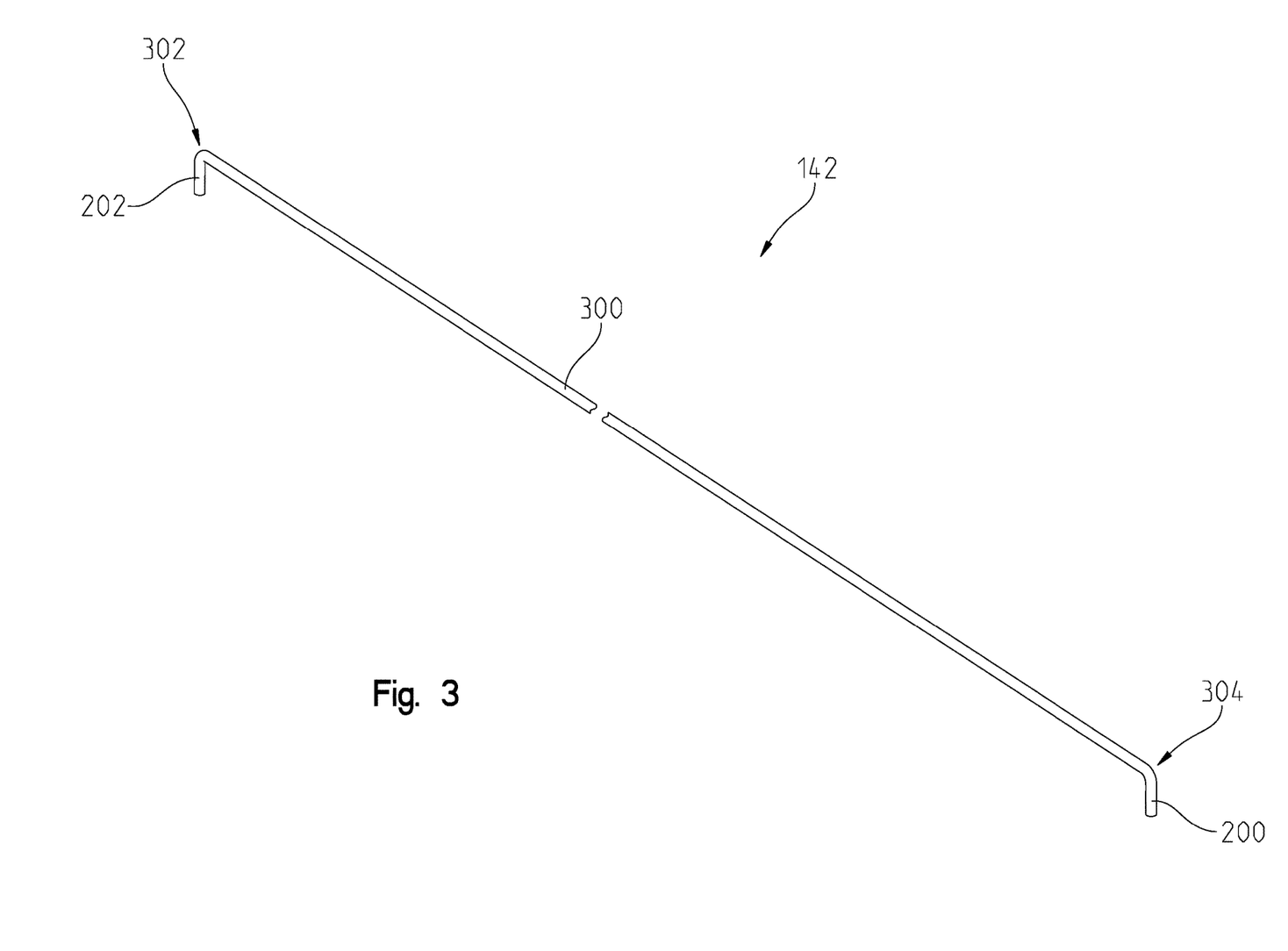
FIG. 3 is a perspective view of a top hook wire.

As shown in FIGS. 1-3, the animal enclosure 100 also includes an elongated bent wire 142. Here, the elongated bent wire 142 includes an elongated portion 300, a first bent end 302 and a second bent end 304, The first bent end 302 and second bent end 304 are each bent in the same direction, as shown in FIG. 3. The bent wire 142 may be removably coupled to the enclosure 100, or as shown in FIGS. 1-2, the bent wire 142 may be welded or affixed to the top panel 114. The bent ends differ from the other wires disposed in the same direction on the top panel 114 such that the first bent end 302 may be disposed on an inside of the front frame 120 and the second bent end 304 may be disposed on an inside of the rear panel 118. This is best shown in FIG. 2.

Referring to FIG. 2, the front frame 120 includes a plurality of horizontal and vertical wires interconnected with one another. The uppermost horizontal wire, i.e., a top horizontal wire 204, of the front frame 120 defines an outer periphery of the frame at its upper end. Likewise, the rear panel 118 includes a plurality of horizontal and vertical wires interconnected with one another, as shown. The uppermost horizontal wire, i.e., top horizontal wire 206, of the rear panel 118 defines an outer periphery of the rear panel 118 at its upper end.

The top panel 114 also includes a plurality of interconnected wires. For instance, a first plurality of wires 208 are oriented in a first direction (e.g., a first horizontal direction in the illustrated embodiment of FIG. 2) and a second plurality of wires 210 are oriented in a second direction (e.g., a second horizontal direction in the illustrated embodiment of FIG. 2), Each of the first plurality of wires 208 include hooked ends 216 that engage the top horizontal wires 204, 206 of the front frame 120 and rear panel 118, respectively. Each of the first plurality of Wires 208 may be spaced from one another approximately the same amount. In other words, adjacent wires may be spaced the same distance from one another between a first end wire 212 and a second end wire 214 of the top panel 114.

In at least one location between adjacent wires of the first plurality of wires 208, the bent wire 142 is disposed. The bent wire 142 is oriented in approximately the same direction as each of the first plurality of wires 208. In other words, in the illustrated embodiment of FIG. 2, the bent wire 142 extends from a location adjacent to the rear panel 118 to a location adjacent to the front frame 124. Moreover, the top panel 114 includes a first end wire 226 and a second end wire 228 of the second plurality of wires 210. The first end wire 226 is disposed adjacent to the top horizontal wire 204 of the front frame 124, and the second end wire 228 is disposed adjacent to the top horizontal wire 206 of the rear panel 118.

A first recess or opening 200 is defined between the top horizontal wire 204 of the front frame 124 and the first end wire 226 of the top panel 114. Likewise, a second recess or opening 202 is defined between the top horizontal wire 206 of the rear panel 118 and the second end wire 228 of the top panel 114. As such, either the first bent end 302 or second bent end 304 may be disposed in the first recess 200, and the other bent end may be disposed in the second recess 202. With the first and second bent ends disposed between the top panel 114 and respective first frame 124 and rear panel 118, additional structural integrity is added to the overall animal enclosure 100. The hooked ends 216 may aid in holding the various frames and panels to one another and prevent an enclosed animal from pushing or forcing the panels or frames apart from one another. Likewise, the bent ends prevent the front frame 124 and rear panel 118 from being pushed or forced inwardly toward the interior of the enclosure 100.

Another aspect of the present disclosure is the design of trimmed corners of one or more panels or frames. In FIG. 2, for example, the top panel 114 is illustrated as including a first trimmed corner 218, a second trimmed corner 220, a third trimmed corner 222, and a fourth trimmed corner 224. Each trimmed corner is defined by one of the first plurality of wires 208 and one of the second plurality of wires 210 being interconnected to one another at a corner of the panel, and neither wire including an eyelet or hooked end. In FIG. 2, for example, the first end wire 212 of the first plurality of wires 208 and the first end wire 226 of the second plurality of wires 228 are coupled to one another and define the first trimmed corner 218. At this location, neither end of the two wires includes a hooked end, but rather each wire may include a blunt end. The same is the case at each of the other three corners of the top panel 114. Thus, the eyelets or hooked ends extend outwardly from either top wire, first end wire, or second end wire, but at each trimmed corner neither wire extends therefrom.

One of the issues with having a hooked end at these corners of the top panel, and more particularly the front panel 120 and rear panel 118, is that the hooked end is subject to damage during transport or shipping. The hooked end can be damaged, bent, or broken during shipping and in some instances it can affect the overall integrity of the animal enclosure 100. Thus, the corners may be trimmed to remove the hooked ends and thus reduce or prevent possible damage to the one or more corners of the crate. A similar design may be incorporated with the bottom panel 116.

Figure 4:
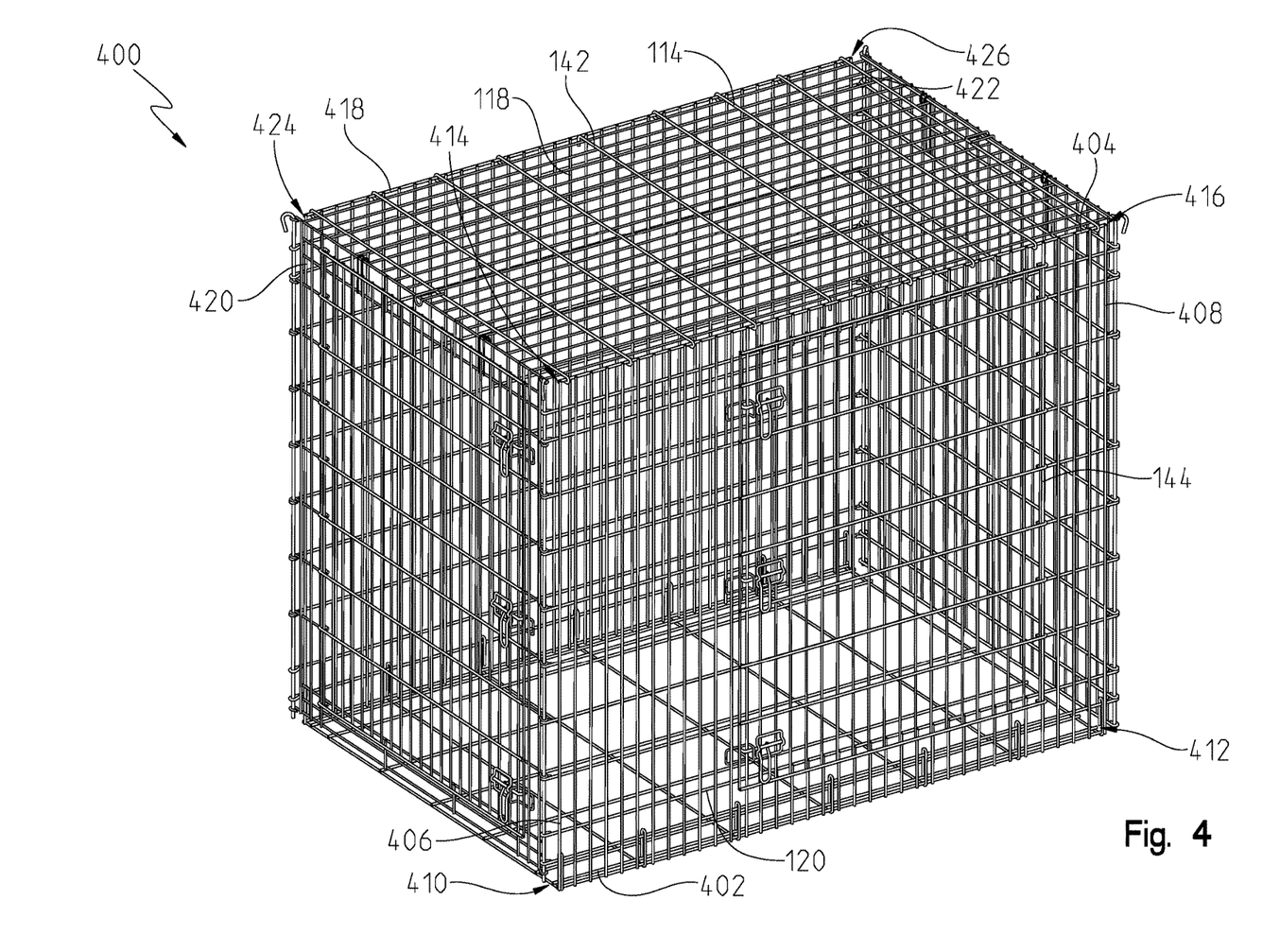
FIG. 4 is a perspective view of another animal enclosure.

Referring to FIG. 4, a different embodiment of an animal enclosure 400 is illustrated. The animal enclosure 400 includes a front 102, rear 104, top 106, bottom 108, first side 110 and second side 112. Moreover, the animal enclosure 400 includes a top panel 114, a bottom panel 116, a rear panel 118, a front frame 120, a side frame 122 and a side panel 124, although these are not labeled on FIG. 4 for clarity reasons.

The animal enclosure 400 does include the bent wire 142 as shown in FIG. 4. The bent wire 142 may be disposed between the front frame 120 and the rear panel 118. In particular, the first bent end 302 may be disposed between a top wire 404 of the front frame 120 and the top panel 114, and the second bent end 304 may be disposed between a top wire 418 of the rear panel 118 and the top panel 114.

In this embodiment, the front frame 120 and the rear panel 118 each include trimmed corners. Based on the orientation of the enclosure 400 in FIG. 4 and the number of wires that form the enclosure, the upper corners of the rear panel 118 are best shown as being trimmed corners. For example, the rear panel 118 includes a first end wire 420 and a second end wire 422. The first end wire 420 and the rear top wire 418 intersect or are joined at a first trimmed corner 424. As shown, there is no hooked end or eyelet formed at the first trimmed corner 424.

In addition, the rear top wire 418 intersects or is joined to the second end wire 422 at a second trimmed corner 426. As shown, there is no hooked end or eyelet formed at the second trimmed corner 426. In other words, the second end wire 422 does not extend beyond the top wire 418, and the top wire 420 does not extend past the second end wire 422. The same is true of the first end wire 420 and the rear top wire 418.

Figure 5:
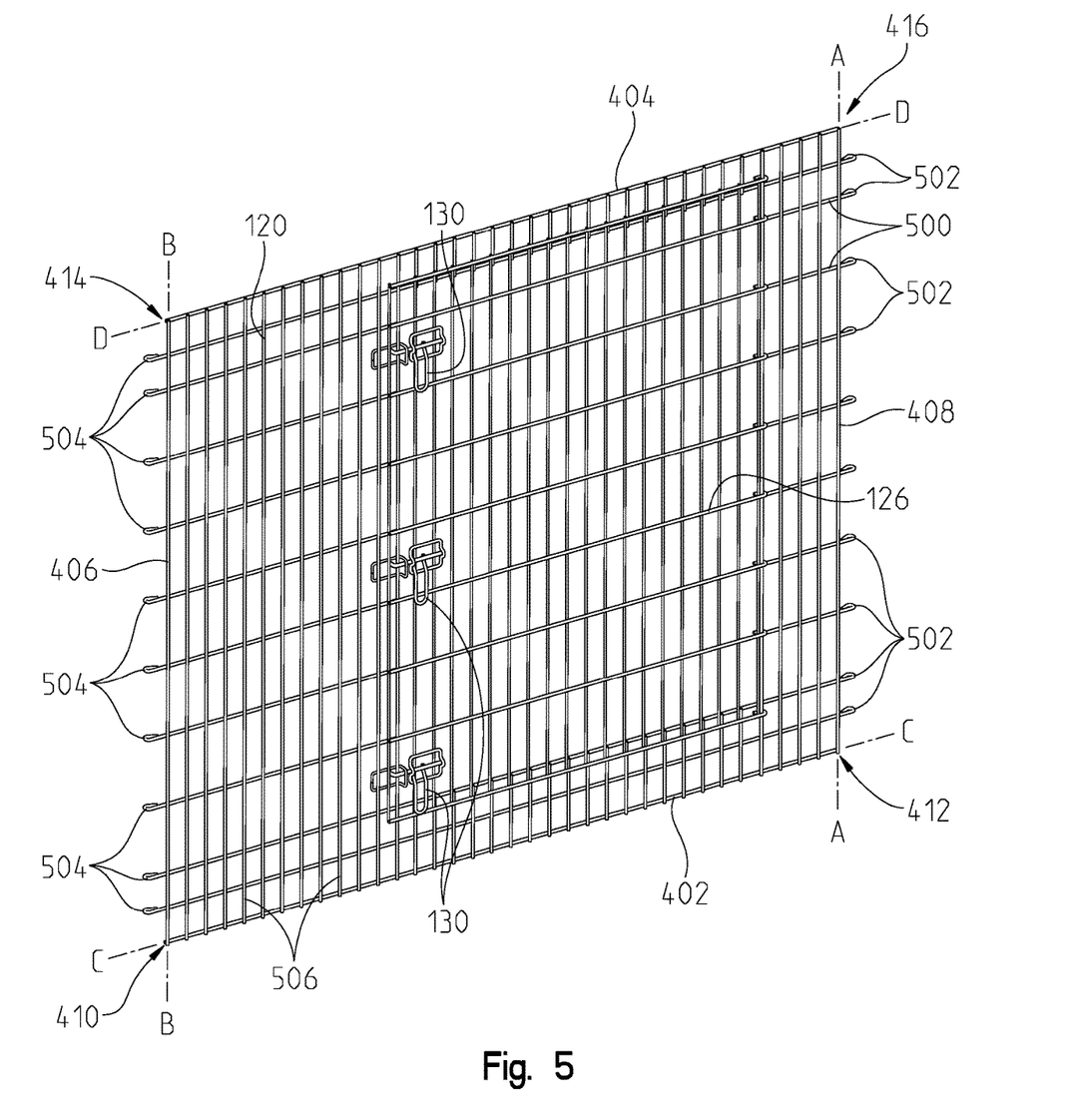
FIG. 5 is a perspective view of a door frame and door of the animal enclosure of FIG. 4.

In FIG. 5, the front frame 120 with the first door 126 coupled thereto is shown. As best shown here, the front frame 120 is formed by a plurality of horizontal wires 500 and a plurality of vertical wires 506. Of the plurality of horizontal wires 500, the front frame 126 includes a bottom wire 402 and the top wire 404. The top wire 404 defines the outer periphery at the top of the front frame 120 (i.e., axis D-D), and the bottom wire 402 defines the outer periphery at the bottom thereof (i.e., axis C-C). Of the plurality of vertical wires 506, the front frame 120 includes a first end wire 406 and a second end wire 408. The first end wire 406 defines an outer periphery (i.e., axis B-B) of the front frame 120 at one side thereof, and the second end wire 408 defines an outer periphery (i.e., axis A-A) of the front frame 120 at an opposite side thereof. As such, the perimeter or outer periphery of the front frame 120 is largely defined by the top wire 404, the bottom wire 402, the first end wire 406, and the second end wire 408.

In this embodiment, each of the plurality of horizontal wires 500 except for the bottom wire 402 and top wire 404 include hooked ends 502, 504 at the ends thereof. The hooked ends 502, 504 define eyelets or an opening for the elongated hook to slide therethrough. It is also noteworthy that the hooked, ends 502 extend beyond the outer periphery defined by the second end wire 408, and the hooked ends 504 extend beyond the outer periphery of the front frame 120 defined by the first end wire 406.

As noted above, however, the bottom wire 402, top wire 404, first end wire 406 and second end wire 408 do not form hooked ends at either end of the respective wire. Instead, the first end wire 406 is coupled to the bottom end wire 402 at a first trimmed corner 410. The second end wire 408 is coupled to the bottom wire 402 at a second trimmed corner 412, The first end wire 406 is coupled to the top wire 404 at a third trimmed corner 414, and the second end wire 408 is coupled to the top wire 404 at a fourth trimmed corner 416. The wires may be coupled to one another via a welding process, adhesive, a bonding process, or any other known process.

While the embodiments of FIGS. 4 and 5 illustrate the front frame 120 and rear panel 118 as having trimmed corners, in other embodiments the side frame 122 or side panel 124 may also include trimmed corners. Alternatively or in addition, the top panel 114 and bottom panel 116 may also include trimmed corners.

Also, while only a single bent wire 142 is shown in the illustrated embodiments, it is possible for additional bent wires to be incorporated into any embodiment. In FIG. 2, for example, any of the first plurality of wires 208 may be formed as a bent wire 142. Alternatively, in a different embodiment, any of the second plurality of wires 210 may be formed as a bent wire 142. Further, while only the top panel 114 is shown as including a bent wire 142, the bottom panel 116, rear panel 118, front frame 120, side frame 122, or side panel 124 may include one or more bent wires 142.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An animal enclosure, comprising:
a plurality of members defining an interior of the enclosure, where the plurality of members includes at least a first member;
a frame of the first member having a plurality of interconnected wires that define an opening for an animal to pass therethrough and to enter or exit the interior of the enclosure;
a door of the first member having a plurality of interconnected wires and being coupled to the frame, the door being pivotable about a pivot wire of the frame to move between an open position and a closed position;
a latch assembly for releasably coupling the door and the frame to one another; and
the plurality of interconnected wires of the first member comprising a plurality of horizontal wires and a plurality of vertical wires, where the plurality of horizontal wires includes a top wire and a bottom wire, and the plurality of vertical wires includes a first end wire and a second end wire;
wherein, the top wire, the bottom wire, the first end wire, and the second end wire define an outer periphery of the first member;
wherein, the top wire is coupled at one end to the first end wire to form a first corner and at an opposite end to the second end wire to form a second corner, and the bottom wire is coupled at one end to the first end wire to form a third corner and at an opposite end to the second end wire to form a fourth corner;
wherein, at least one of the plurality of horizontal or vertical wires forms a hooked end for coupling to another of the plurality of members, and the top wire, bottom wire, first end wire and second end wire do not form a hooked end, and
wherein, the plurality of interconnected wires is arranged such that at least one of:
(i) the top wire defines an axis and the hooked end of the at least one of the plurality of vertical wires extends beyond the axis defined by the top wire and outer periphery defined by the top wire,
(ii) the first end wire defines an axis and the hooked end of the at least one of the plurality of horizontal wires extends beyond the axis defined by the first end wire and outer periphery defined by the first end wire, and
(iii) the second end wire defines an axis and the hooked end of the at least one of the plurality of horizontal wires extends beyond the axis defined by the second end wire and outer periphery defined by the second end wire.

2. The animal enclosure of claim 1, wherein:
the bottom wire defines an axis; and
the hooked end of the at least one of the plurality of vertical wires extends beyond the axis and outer periphery defined by the bottom wire.

3. An animal enclosure, comprising:
a plurality of members defining an interior of the enclosure, where the plurality of members includes a top member, a bottom member, a first side member, a second side member, a third side member, and a fourth side member;
a door having a plurality of interconnected wires and being coupled to the first member, the door being pivotable or slideable about a pivot wire of the first member so that the door is movable between an open position and a closed position;
a latch assembly for releasably coupling the door and the first side member to one another;
a bent wire formed by an elongated body have a first bent end and a second bent end, the first bent end and second bent end being bent in a same direction relative to the elongated body;
wherein, the bent wire is coupled to the top member, and is disposed between the first side member and the second side member.

4. The animal enclosure of claim 3, wherein:
the first side member includes a first top wire and the second side member includes a second top wire; and
the first bent end is disposed between the top member and the first top wire, and the second bent end is disposed between the top member and the second top wire.

5. The animal enclosure of claim 4, wherein the top member comprises a plurality of horizontal wires and a plurality of vertical wires interconnected with one another;
further wherein, the bent wire is coupled to the top member and oriented in the same direction as either the plurality of horizontal wires or the plurality of vertical wires.

6. The animal enclosure of claim 5, wherein:
the plurality of horizontal wires comprises a first horizontal end wire and a second horizontal end wire, the first and second horizontal end wires defining outer peripheries of the top panel at each respective end thereof;
the plurality of vertical wires comprises a first vertical end wire and a second vertical end wire, the first and second vertical end wires defining outer peripheries of the top panel at each respective end thereof; and
the first bent end is coupled to the first vertical end wire and the second bent end is coupled to the second vertical end wire, or the first bent end is coupled to the first horizontal end wire and the second bent end is coupled to the second horizontal end wire.

7. The animal enclosure of claim 6, wherein the first bent end is disposed between the first vertical end wire and the first top wire and the second bent end is disposed between the second vertical end wire and the second top wire, or the first bent end is disposed between the first horizontal end wire and the first top wire and the second bent end is disposed between the second horizontal end wire and the second top wire.

8. The animal enclosure of claim 3, further comprising a second bent wire formed by an elongated body have a first bent end and a second bent end, the first bent end and second bent end being bent in a same direction relative to the elongated body;

wherein, the second bent wire is coupled to the bottom member, and the first bent end of the second bent wire is disposed between the bottom member and the first side member, and the second bent end of the second bent wire is disposed between the bottom member and the second side member.

9. The animal enclosure of claim 3, further comprising a second bent wire formed by an elongated body have a first bent end and a second bent end, the first bent end and second bent end being bent in a same direction relative to the elongated body;
wherein, the second bent wire is coupled to the bottom member, the first side member, the second side member, the third side member or the fourth side member, and the first bent end of the second bent wire is disposed between whichever member it is coupled to and another of the bottom member, the first side member, the second side member, the third side member or the fourth side member, and the second bent end of the second bent wire is disposed between whichever member it is coupled to and another of the bottom member, the first side member, the second side member, the third side member or the fourth side member.

10. The animal enclosure of claim 3, wherein:
each of the top member, bottom member, first side member, second side member, third side member, and fourth side member comprises a plurality of horizontal wires and a plurality of vertical wires, where the plurality of horizontal wires includes a top wire and a bottom wire, and the plurality of vertical wires includes a first end wire and a second end wire; and
the top wire, the bottom wire, the first end wire, and the second end wire define an outer periphery of the each member.

11. The animal enclosure of claim 10, wherein:
the top wire of at least one member is coupled at one end to the first end wire of the same member to form a first corner and at an opposite end to the second end wire of the same member to form a second corner, and the bottom wire of the at least one member is coupled at one end to the first end wire of the same member to form a third corner and at an opposite end to the second end wire of the same member to form a fourth corner;
at least one of the plurality of horizontal or vertical wires of the at least one member forms a hooked end; and
the top wire, bottom wire, first end wire and second end wire do not form a hooked end.

12. The animal enclosure of claim 11, wherein:
the top wire of the at least one member defines an axis; and
the hooked end of the at least one of the plurality of vertical wires extends beyond the axis and outer periphery defined by the top wire.

13. The animal enclosure of claim 11, wherein:
the bottom wire of the at least one member defines an axis; and
the hooked end of the at least one of the plurality of vertical wires extends beyond the axis and outer periphery defined by the bottom wire.

14. The animal enclosure of claim 11, wherein:
the first end wire of the at least one member defines an axis; and
the hooked end of the at least one of the plurality of horizontal wires extends beyond the axis and outer periphery defined by the first end wire.

15. The animal enclosure of claim 11, wherein:
the second end wire of the at least one member defines an axis; and
the hooked end of the at least one of the plurality of horizontal wires extends beyond the axis and outer periphery defined by the second end wire.

16. The animal enclosure of claim 10, wherein:
the top wire of another of the top, bottom, first, second, third or fourth member is coupled at one end to the first end wire of the same member to form a first corner and at an opposite end to the second end wire of the same member to form a second corner, and the bottom wire of the another member is coupled at one end to the first end wire of the same member to form a third corner and at an opposite end to the second end wire of the same member to form a fourth corner;
at least one of the plurality of horizontal or vertical wires of the another member forms a hooked end; and
the top wire, bottom wire, first end wire and second end wire do not form a hooked end.

17. A side of an animal enclosure, comprising:
a plurality of interconnected horizontal and vertical wires, where the plurality of horizontal wires includes a top wire and a bottom wire, and the plurality of vertical wires includes a first end wire and a second end wire; and
a plurality of hooked ends formed at the ends of either the plurality of horizontal wires or the plurality of vertical wires;
wherein, the top wire, the bottom wire, the first end wire, and the second end wire define an outer periphery of the first member, the plurality of hooked ends extending beyond the outer periphery defined by the top wire, the bottom wire, the first end wire, and the second end wire;
wherein, the top wire is coupled at one end to the first end wire to form a first corner and at an opposite end to the second end wire to form a second corner, and the bottom wire is coupled at one end to the first end wire to form a third corner and at an opposite end to the second end wire to form a fourth corner;
further wherein, the top wire, bottom wire, first end wire and second end wire do not form a hooked end at any of their respective ends.

* * * * *